US006883299B1

(12) United States Patent
Gramm

(10) Patent No.: US 6,883,299 B1
(45) Date of Patent: Apr. 26, 2005

(54) HEIGHT SENSOR ARRANGEMENT FOR AGRICULTURAL APPLICATIONS

(76) Inventor: Richard Gramm, 3529 Fir Rd., Bremen, IN (US) 46506

( * ) Notice: Subject to any disclaimer, the term of this patent is extended or adjusted under 35 U.S.C. 154(b) by 0 days.

(21) Appl. No.: 10/634,929

(22) Filed: Aug. 5, 2003

(51) Int. Cl.[7] ............................................... A01D 75/28
(52) U.S. Cl. ....................................... 56/10.2 E; 172/4
(58) Field of Search ......................... 56/10.2 A–10.2 E, 56/10.2 R, 17.1, 17.2, 121.46, 51, 94, 73, 84, DIG. 3, DIG. 10; 172/2–8

(56) References Cited

U.S. PATENT DOCUMENTS

| | | |
|---|---|---|
| 2,752,835 A | 7/1956 | Wright |
| 3,196,599 A | 7/1965 | Meiners et al. |
| 3,568,420 A | 3/1971 | Hofer et al. |
| 3,611,286 A | 10/1971 | Cleveland |
| 3,886,718 A | 6/1975 | Talbot |
| 3,896,899 A | 7/1975 | Scholl |
| 4,064,945 A | 12/1977 | Haney |
| 4,147,016 A | 4/1979 | Jensen et al. |
| 4,171,606 A | 10/1979 | Ziegler et al. |
| 4,180,133 A | 12/1979 | Collogan et al. |
| 4,199,925 A | 4/1980 | Quick et al. |
| 4,211,057 A | 7/1980 | Dougherty et al. |
| 4,332,126 A | 6/1982 | Van Auwelaer et al. |
| 4,437,295 A | 3/1984 | Rock |
| 4,567,719 A | 2/1986 | Soots et al. |
| 4,594,840 A | 6/1986 | D'Almeida et al. |
| 4,607,716 A | 8/1986 | Beck |
| 4,747,260 A | 5/1988 | Petrasen et al. |
| 4,759,173 A | 7/1988 | Ostrup et al. |
| 4,776,153 A | 10/1988 | DePauw et al. |
| 4,902,264 A | 2/1990 | Diekhans et al. |
| 4,928,890 A | 5/1990 | Swicher, Jr. |
| 4,942,724 A | 7/1990 | Diekhans et al. |
| 5,082,189 A | 1/1992 | Ernst et al. |
| 5,090,184 A | 2/1992 | Garter et al. |
| 5,115,628 A | 5/1992 | Garter et al. |
| 5,151,064 A | 9/1992 | Damman et al. |
| 5,189,806 A | 3/1993 | McMurtry et al. |
| 5,195,309 A | 3/1993 | Mossman |
| 5,463,854 A | 11/1995 | Chmielewski, Jr. et al. |
| 5,471,823 A | 12/1995 | Panoushek et al. |
| 5,471,825 A | 12/1995 | Panoushek et al. |

(Continued)

FOREIGN PATENT DOCUMENTS

| | | |
|---|---|---|
| DE | 2900320 A1 | 7/1980 |
| DE | 3230330 A | 2/1984 |
| DE | 3326666 A | 1/1985 |
| DE | 3430125 A | 2/1986 |

OTHER PUBLICATIONS

"Header Height Control"; May–Wes Manufacturing Inc., Gibbon, MN, Copyright 1989.

(Continued)

*Primary Examiner*—Robert E. Pezzuto
(74) *Attorney, Agent, or Firm*—Emrich & Dithmar LLC

(57) ABSTRACT

A sensor for detecting the height above the soil of harvesting machinery such as a combine header includes an elongated, curved, flexible arm attached at one end to a rotation sensor mounted to the harvester. The sensor arm is concave in an upward direction and includes and outer sheath such as of plastic and an inner metal rod for increased strength to resist breakage such as during turns and when traversing irregular terrain. The arm is positioned forward of, or immediately adjacent to, the lowest part of the harvester which includes a cutter assembly for cutting and separating the crop. As the harvester encounters upraised portions of the soil, the arm's point of contact with the soil moves forward along the arm to provide an increasingly early warning of upraised soil to facilitate early height adjustment and the avoidance of soil contact and possible damage to the harvester.

98 Claims, 10 Drawing Sheets

U.S. PATENT DOCUMENTS

| | | |
|---|---|---|
| 5,473,870 A | 12/1995 | Panoushek et al. |
| 5,501,635 A | 3/1996 | Niermann |
| 5,535,577 A | 7/1996 | Chmielewski et al. |
| 5,549,166 A | 8/1996 | Orbach et al. |
| 5,713,190 A | 2/1998 | Vermeulen et al. |
| 5,957,218 A | 9/1999 | Noonan et al. |
| 6,041,583 A | 3/2000 | Goering et al. |
| 6,202,395 B1 | 3/2001 | Gramm |
| 6,481,194 B1 | 11/2002 | Brewer et al. |
| 6,516,595 B1 | 2/2003 | Rhody et al. |
| 6,523,333 B1 | 2/2003 | Metzger |
| 6,530,197 B1 | 3/2003 | Christensen et al. |

OTHER PUBLICATIONS

"1000 Series Corn Head Field Tracker Ground Sensor"; p. 5, RAC 7–88540, 1998 Case Corporation, Aug. 1998.

"Combine Performance Enhancements"; p. 16, John Deere Credit, DSAA6863, no date.

"All–New 50 Series Combines"; p. 15, John Deere Credit, DSAA7129, no date.

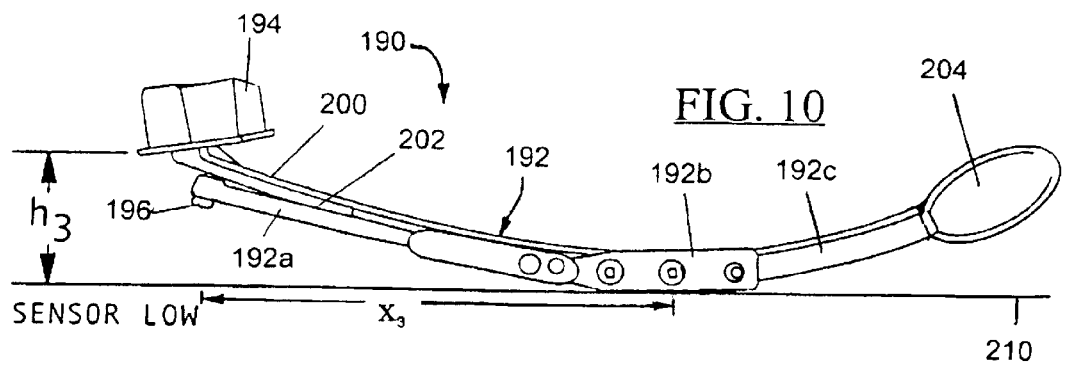
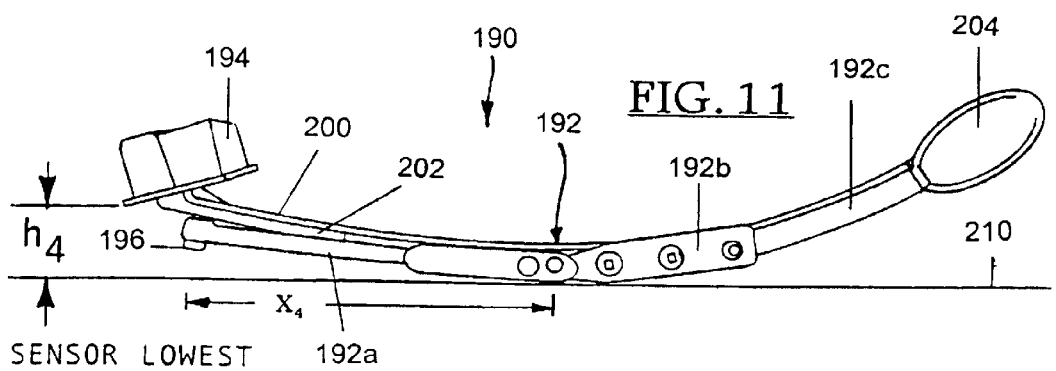
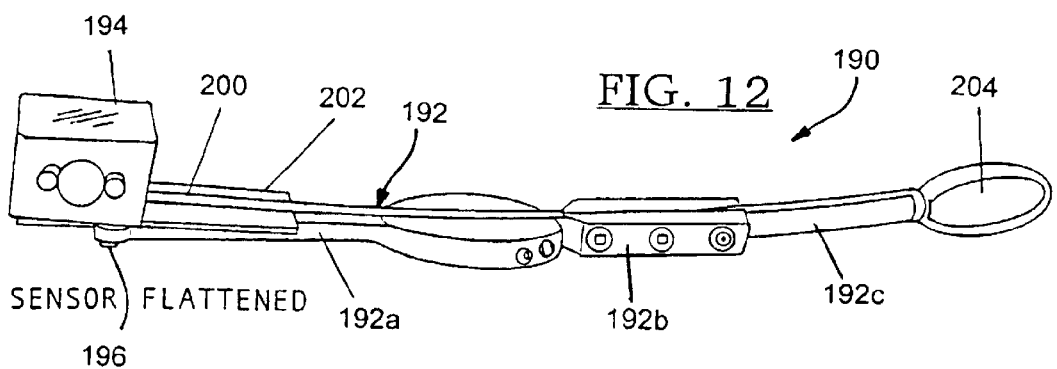

HEIGHT SENSOR ARRANGEMENT FOR AGRICULTURAL APPLICATIONS

FIELD OF THE INVENTION

This invention relates generally to a sensor for detecting the height above the soil of a moving vehicle such as a harvesting machine, and is particularly directed to a ground height sensor having a curved ground engaging arm, wherein the ground engaging point on the arm moves forward as upraised portions of the soil are encountered to provide an increasingly early warning of ground impact as the soil-machine separation is reduced.

BACKGROUND OF THE INVENTION

A common approach to crop harvesting involves the use of a combine having a header on its forward portion for engaging and removing the crop from a field. The header is maintained a designated height above the soil as determined by the type of crop and various operating conditions. Operating with the header too high will result in failure to harvest all of the crop, while operating too close to the soil increases the possibility of damage to the header by impact with rocks and other obstructions in the soil. With the use of longer headers spanning wider tracts, the possibility of impact of the header with the soil and consequent damage to the header and/or combine has correspondingly increased.

Various types of height sensors are used to maintain the harvesting machine a designated height above the soil for optimum crop recovery. Most current height sensors employ a ground engaging arm suspended from the header and extending rearwardly relative to the direction of travel. A cutter assembly is located in a bottom portion of the header housing forward of the height sensor arm. Thus, the sensor arm provides information regarding vertical separation between the cutter assembly and the soil with respect to soil the cutter assembly has already passed over. The inability to sense and provide information regarding terrain in front of the header limits the accuracy of the height control signals provided by the height sensor. Moreover, as the header gets closer to the ground, current sensor arms engage the ground even further aft of the cutter assembly thus increasing the separation between the position of the cutter assembly and the location of the soil the height of which is actually being detected.

The height sensor typically includes a thin rod extending rearwardly and engaging the soil. These sensor arms are subjected to large forces. For example, a downward force is applied to the sensor arm to ensure that its distal end engages the soil. This downward force is of sufficient magnitude to allow the arm to penetrate plant residue in order to contact the soil. In addition, crop rows are frequently curvilinear to accommodate terrain contour. Harvesting curvilinear crop rows results in the application of large lateral forces on the sensor arm. The capability of combines, which incorporate rear steering, to rapidly turn and change direction increases the likelihood of sensor arm damage caused by the application of large lateral forces. In addition, field terracing wherein upraised strips of soil or elongated shallow depressions, or ditches, in the soil are formed in a spaced manner over a field are increasingly used to reduce erosion. Traversing these upraised strips of soil or spaced depressions also subjects the height sensor arm to large forces while placing greater demands on sensing and reacting to changes in soil elevation to avoid damage to harvesting machinery. Also, in an attempt to maximize crop recovery, harvesting headers are increasingly being employed at lower heights above the soil with increased force being applied to the height sensor arm. All of these factors tend to increase the likelihood of damage to the height control sensor resulting in harvester down time and production losses.

Finally, header height control sensors are generally not designed with the configuration of existing headers as a primary consideration. Thus, the typical header height sensor is not adapted for retrofitting on an existing header without header modification. For example, one current soil height sensor employs a pair of pivotally connected curved arms mounted to a lower portion of the header housing. In order to accommodate this multi-section height sensor arm, the lower surface of the header housing is provided with a recessed portion to receive the arm sections for storage and protection of the arms from damage when not in use. Not all harvester heads are provided with these height sensor arm storage recesses, thus, limiting the use of this type of sensor arm to headers having these recesses.

The present invention addresses the aforementioned limitations of the prior art by providing a height sensor arrangement particularly adapted for use in agricultural applications such as on a harvester which provides an increasingly early warning of upraised soil about to be traversed by the harvester as its height above the soil is reduced. This allows for more accurate height positioning of the harvester, thus reducing the possibility of impact with the soil and damage to the harvester. The height control sensor arrangement is particularly adapted for positioning in a forward, lower portion of the harvester to provide an even earlier warning of upraised soil to allow for harvester height adjustment.

OBJECTS AND SUMMARY OF THE INVENTION

Accordingly, it is an object of the present invention to provide a height sensor for an agricultural implement traversing a field which increases the time between detection and traversal of high points in the soil to facilitate implement height adjustment and the avoidance of impact with the soil.

It is another object of the present invention to provide a curved arm for a ground height sensor which is of high strength and rugged, is flexible allowing the sensor to be lowered to the ground without damaging or breaking the arm, and engages the ground at a point along its length which moves forward in the direction of travel as the height sensor is lowered to provide an earlier warning of contact with upraised portions of the ground.

Yet another object of the present invention is to provide a ground height sensor particularly adapted for agricultural applications, such as for use on a harvester of the combine header type, which can be easily mounted using conventional hardware at a location forward of or adjacent to the header's cutterbar.

A further object of the present invention is to provide a ground height sensor for use in a combine header which is easily installed on either end or on an inner portion of a header anywhere along its length without requiring modification of the header.

The present invention contemplates apparatus for use in an agricultural implement for measuring the height of the agricultural implement above the soil as the agricultural implement traverses a field. The apparatus comprises a shaft mounted to the agricultural implement; a rotation sensor coupled to the shaft and responsive to rotation of the shaft for providing an output signal representing rotational displacement of the shaft; and a curved flexible arm having a proximal end connected to the shaft and a distal end engaging the soil, wherein the arm is concave in an upward direction and rotates in a first direction when the arm contacts upraised soil and rotates in a second opposed direction when the arm contacts a depression in the soil, and wherein a point of contact of the arm with the soil moves forward in a direction of travel of the implement toward the proximal end of the arm as the height of the implement above the soil is reduced to provide an increasingly early indication of contact with the soil of the implement as its height above the soil decreases.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIGS. 8–12 are side elevation views of another embodiment of the height sensor of the present invention illustrating the manner in which the point of contact of the sensor arm moves forward along the length of the arm in the direction of travel as the separation between the sensor and the soil is reduced.

DETAILED DESCRIPTION OF THE PREFERRED EMBODIMENTS

Figure 1:
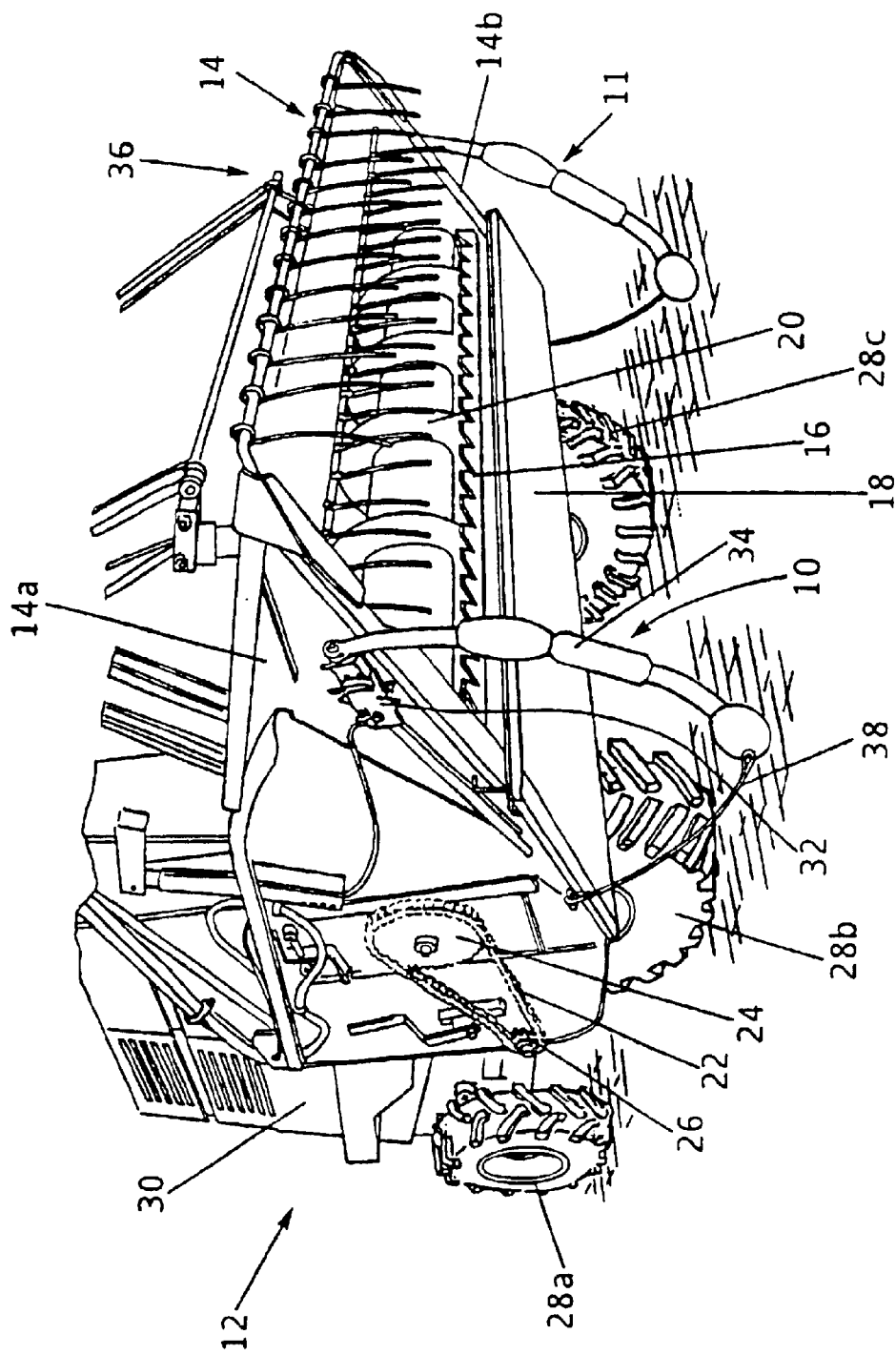
FIG. 1 is a partial front perspective view of a combine with an attached header incorporating a height sensor in accordance with the principles of the present invention.

Referring to FIG. 1, there is shown a partial front perspective view of a height sensor arrangement 10 for use on a header 14 attached to a forward portion of a combine 12. Combine 12 is conventional in design and operation and includes a chassis 30 disposed on and supported by four wheels, three of which are shown in the figure as elements 28a, 28b and 28c. An operator is positioned within a cabin disposed in the chassis. Also disposed within the chassis are a means for propulsion and various grain processing stages as well as a storage bin for temporarily storing grain separated from plants ingested by the header. These portions of combine 12 are conventional and are not part of the present invention and are thus not shown in FIG. 1. Header 14 is also conventional in design and operation and includes a crop gathering unit 36 (partially shown in the figure) used in the harvesting of various grains. Header 14 also includes an elongated housing oriented generally at 90° relative to the direction of travel of the combine during harvesting.

Header 14 includes first and second end panels 14a and 14b. While only one header section is shown attached to a forward portion of combine 12 in FIG. 1, plural header sections attached by means of their respective end panels may be connected together and mounted to a forward portion of the combine to provide a wide harvesting path. Typically attached to an upper portion of header 14 is a crop engaging/gathering mechanism 36 for directing the severed plant residue into the combine for processing, with only a portion of this mechanism shown in FIG. 1 because it does not form a part of the present invention. Shown respectively attached to the first and second header end panels 14a, 14b are first and second height sensor arrangements 10 and 11 which are similar in operation and configuration as they embody the principles of the present invention. Extending lengthwise along the header 14 is an auger 20 also oriented generally transverse to the direction of travel of the combine 12. Auger 20 is rotationally displaced by means of a combination of a driven sprocket 24, a drive chain 22 and a drive sprocket 26 which is rotationally displaced by the combine's engine (not shown). Auger 20 is provided with a pair of complementary spiral sections which direct grain and plant residue taken in by the header 14 toward the center of the header housing where it is directed aft into the combine's feederhouse (not shown) for processing within the combine. The bottom of the header 14 is provided with a skid plate 18 extending the length of the header housing which is adapted to engage and ride over upraised portions of uneven soil. Disposed adjacent a forward portion of the skid plate 18 is a cutterbar 16 which operates in a reciprocating manner to sever the upper portion of plants engaged by the header 14 as the combine 12 traverses a field. The thus severed plants, with grain attached thereto, are directed into the header's transverse auger 20 for processing as described above.

Because the first and second height sensor arrangements 10 and 11 are similar in operation and configuration, only the first height sensor arrangement will be described in detail for simplicity. The first height sensor arrangement 10 includes a curved, flexible arm 34 having a first proximal end and a second, opposed distal end. The height sensor arrangement 10 further includes a sensor mechanism 32 mounted to the header's first end panel 14a and attached to the proximal end of arm 34 for supporting the arm in a suspended manner. Sensor mechanism 32 is described in detail below. The distal end of arm 34 is attached to an aft portion of header 14 by means of a high strength connecting cable 38 which is preferably comprised of steel. Connecting cable 38 prevents damage to the sensor arm 34 in the event the combine 12 is reversed in direction.

Figure 2:
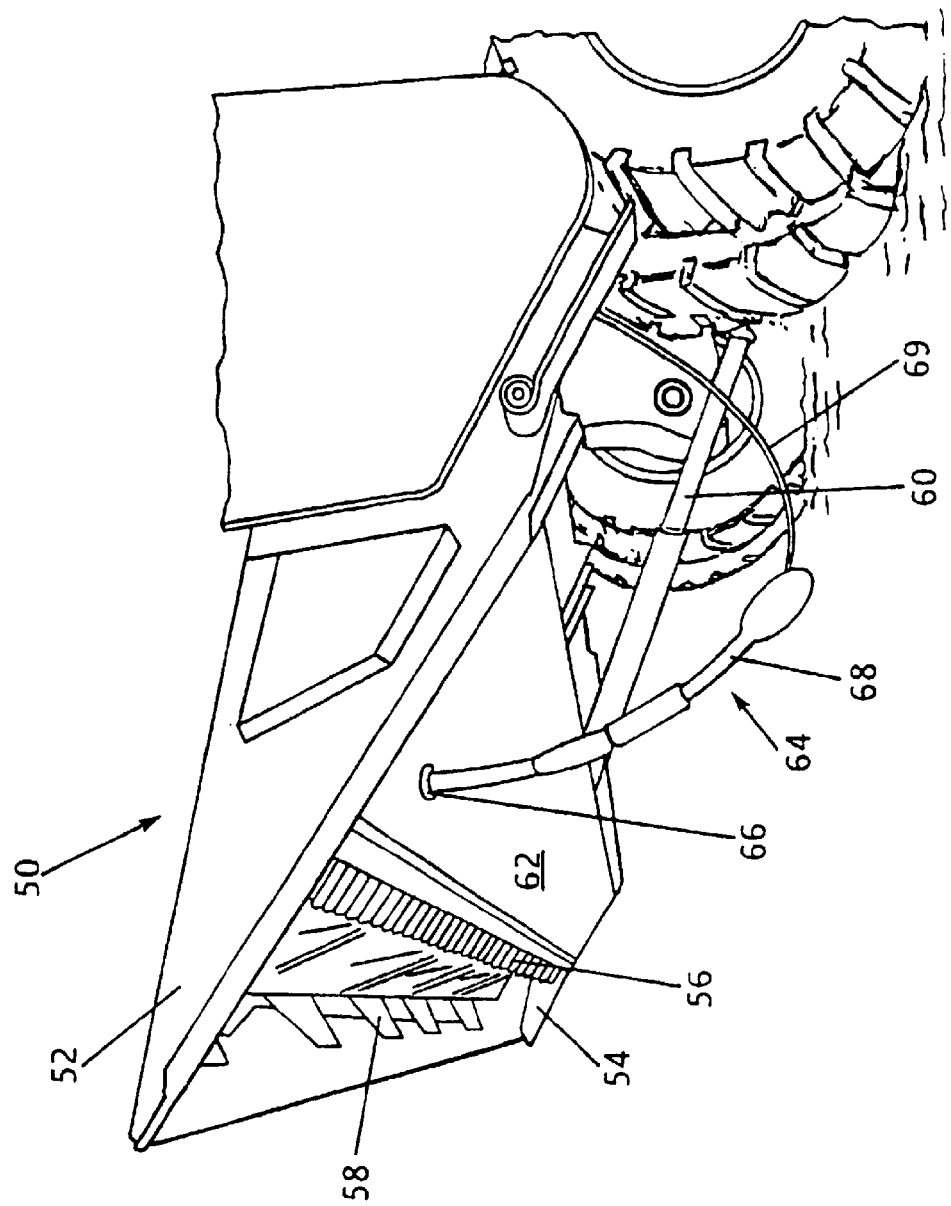
FIG. 2 is a partial perspective view of a lower portion of a combine header illustrating the mounting of a height sensor on an inner, lower portion of the header in accordance with another aspect of the present invention.

Referring to FIG. 2, there is shown another embodiment of a height sensor arrangement 64 in accordance with the principles of the present invention. As in the previously described embodiment, height sensor arrangement 64 is attached to a header 50 having first and second end panels 52 and 54 as well as a crop gathering unit 58 attached to an upper portion of the header. A cutterbar assembly 56 is disposed in a lower, forward portion of the header 50 immediately forward of a skid plate 62 forming the bottom portion of the header. In the embodiment shown in FIG. 2, the height sensor arrangement 64 is attached to and suspended from the header's skid plate 62 by means of a mounting assembly 66 described in detail below. As in the previously described embodiment, the height sensor arrangement 64 includes a curved, flexible arm 68 and a connecting cable 69 coupling a distal end of the arm to an aft portion of the header 50. A hydraulic cylinder 60 is connected between the header 50 and the combine for raising and lowering the header between a nonuse position and a use position and for changing the height of the header above the soil in accordance with output signals from the height sensor arrangement of the present invention.

Figure 3:
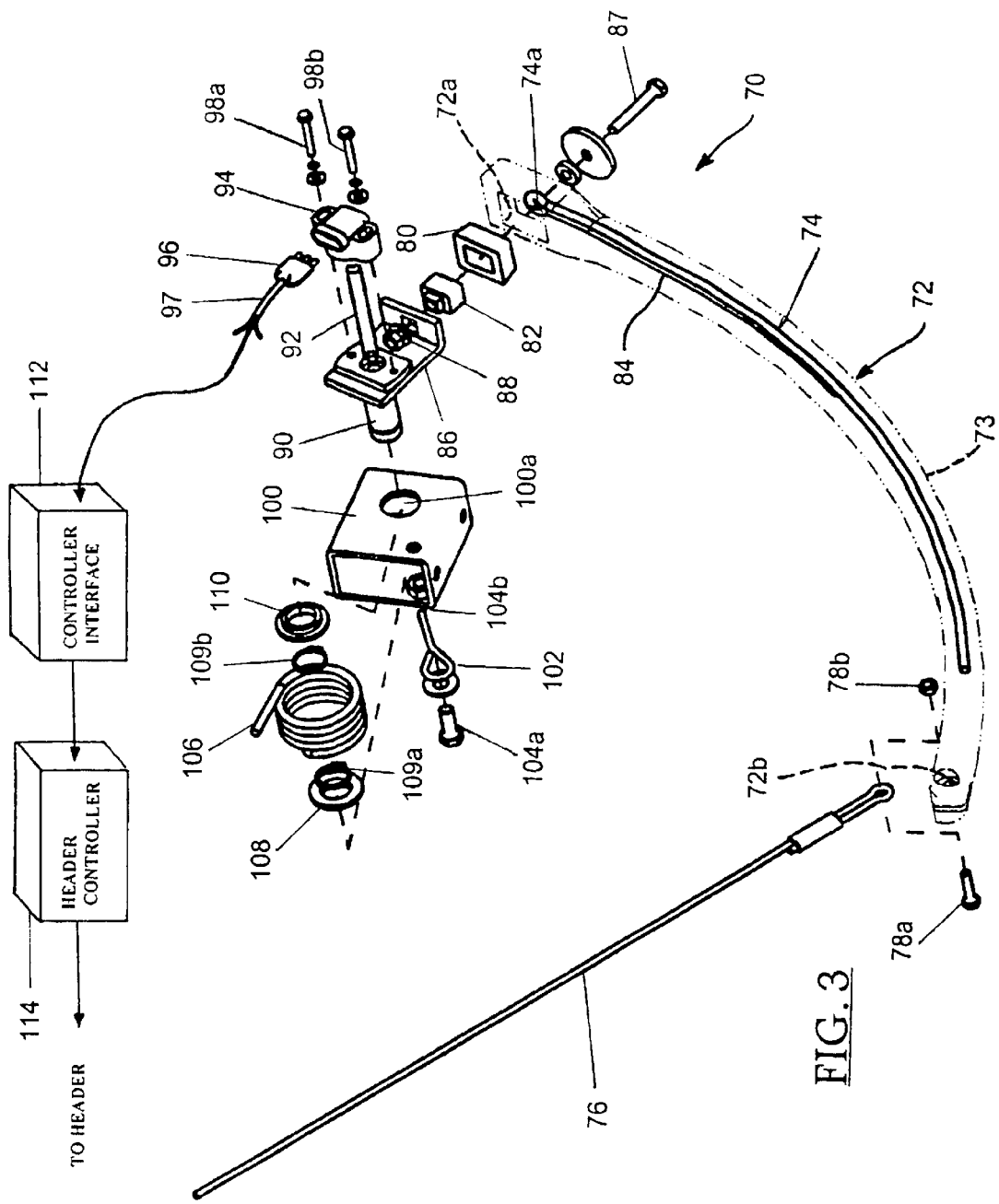
FIG. 3 is an exploded perspective view of one embodiment of a height sensor in accordance with the present invention.
Figure 4:
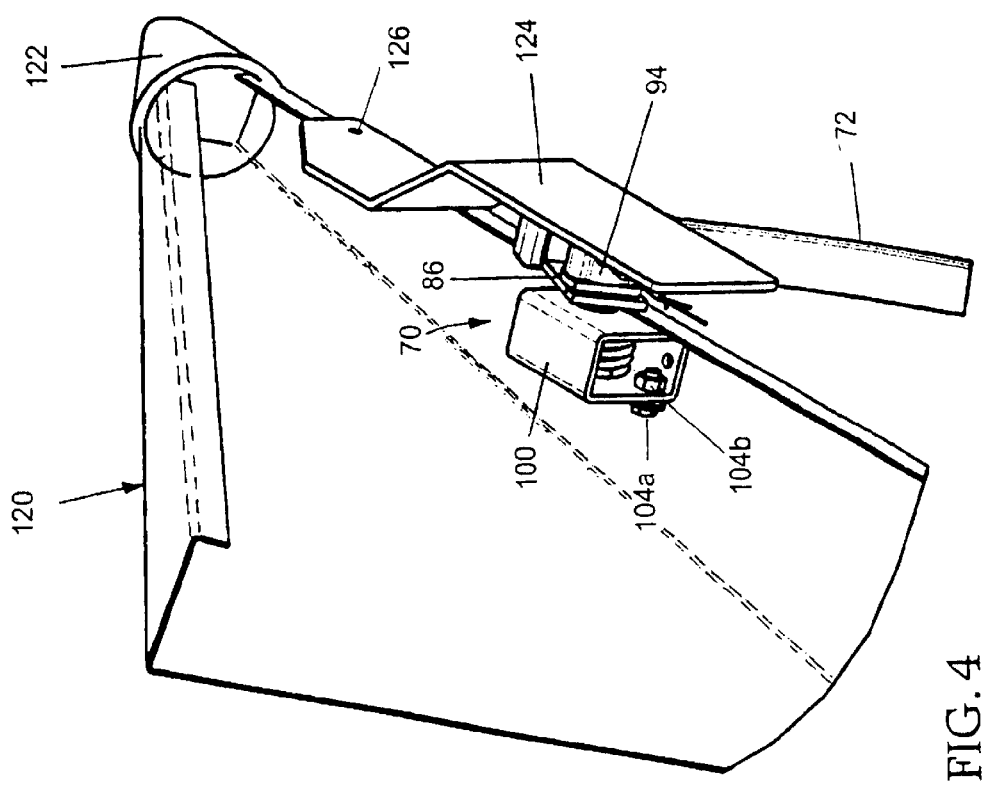
FIG. 4 is a perspective view illustrating details of the manner in which the height control sensor shown in FIG. 4 is attached to a combine header.
Figure 5:
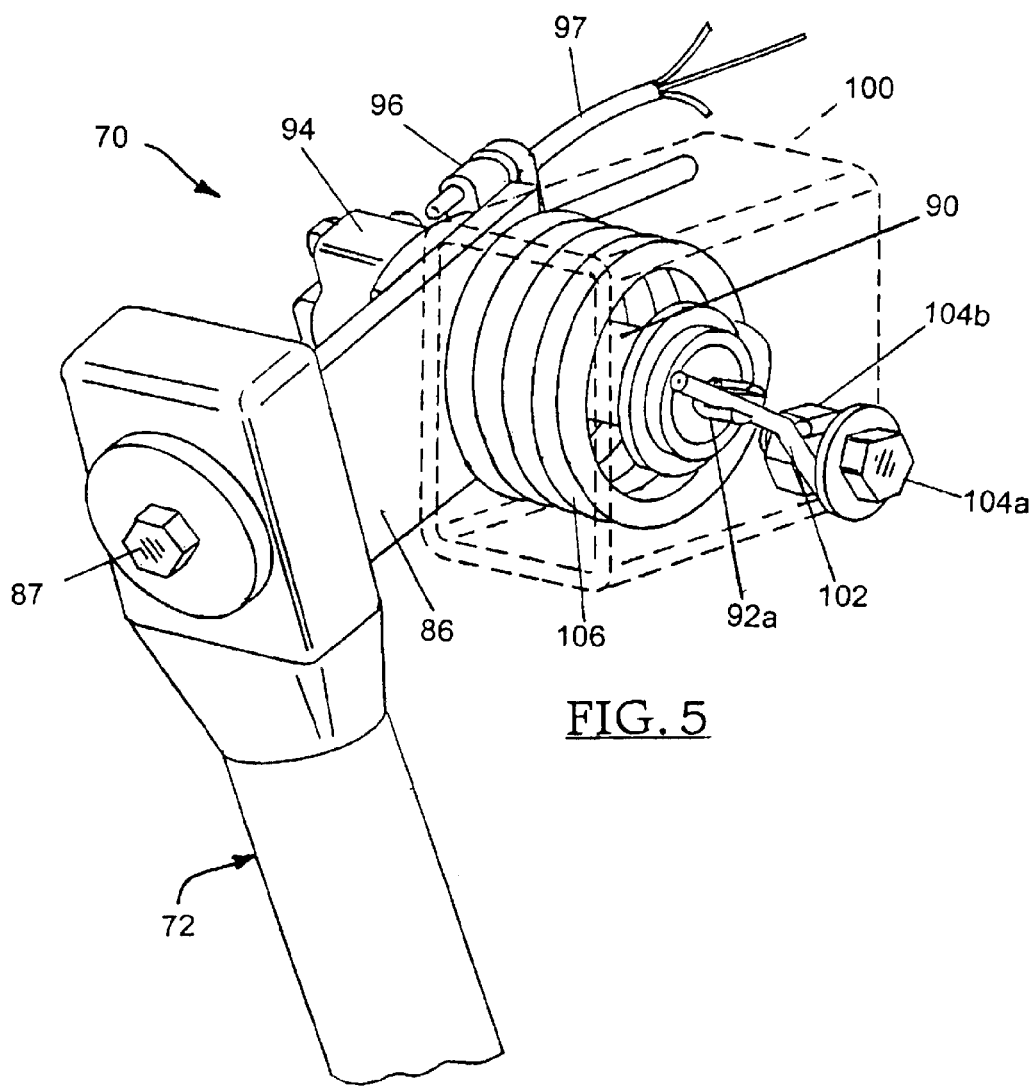
FIG. 5 is a partial perspective view shown partially in phantom illustrating additional details of the inventive height sensor.

Referring to FIG. 3, there is shown an exploded perspective view of a height sensor arrangement 70 in accordance with another embodiment of the present invention. FIG. 4 is a perspective view of the height sensor arrangement 70 as installed on a header crop divider 120, while FIG. 5 is a perspective view of the height sensor arrangement in assembled form. The height sensor arrangement 70 shown in FIG. 3 is adapted for attachment to a side panel of a header as shown for the case of height sensor arrangements 10 and 11 in FIG. 1. Height sensor arrangement 70 includes an elongated, curved flexible arm 72 having an outer elastomeric sheath 73 shown in dotted line form in the figure and an inner high strength spring steel shaft 74 which is capable of flexing. Elastomeric sheath 73 protects arm 72 by absorbing high energy impact forces exerted on the arm such as when it engages an obstruction such as a rock or root in the field. Extending from a first end of the arm 72 and disposed within the outer elastomeric sheath 73 and connected to the spring steel shaft 74 such as by weldments is a metal reinforcing member 84 which provides the arm 72 with very high strength, particularly with respect to lateral forces. The combination of shaft 74 and reinforcing member 84 may also be formed by bending the shaft back upon itself and positioning the curved bent-back portion in closely spaced relation to the proximal end of the shaft as in the embodiment shown in FIG. 3. Each of the elastomeric sheath 73, shaft 74 and reinforcing member 84 is provided with the same radius of curvature along those portions of its respective length where it is in contact with one or more of the other two members, and none of these shaft members has a constant, fixed radius along its entire length. Each shaft member will assume its original curvature following removal of a force which changes its curvature. Arm 72 is flexible and has a curvilinear shape as shown in the figure for purposes which are discussed in detail below. One end of the spring steel shaft 74 is provided with an aperture 74*a* for installing the arm in the height sensor arrangement 70. A first proximal end of arm 72 is provided with a first end aperture 72*a*, while second opposed end of arm is provided with a second distal end aperture 72*b*. The second end aperture 72*b* is adapted for receiving the combination of a threaded member 78*a* and a nut 78*b* for attaching one end of the connecting cable 76 to the second distal end of the arm 72. The first end aperture 72*a* of the arm 72 is adapted to receive the combination of an elastomeric bushing 80 and an insert member 82. The insert member 82 is inserted within the elastomeric bushing 80 and includes an aperture extending therethrough. The aperture in the insert member 82 is adapted to receive a threaded member 87 which is also inserted through the aperture 74*a* in the end of the spring steel shaft 74 for attaching the proximal end of the arm 72 to a bracket 86. The proximal end of arm 72 is securely attached to bracket 86 by means of the combination of the threaded member 87 and a nut 88. Also attached to bracket 86 by means of first and second threaded members 98*a* and 98*b* is a rotation sensor 94. Rotation sensor 94 is electrically coupled to the combination of a header controller 114 and a controller interface 112 by means of the combination of an electrical connector 96 and one or more electrical leads 97.

Bracket 86 includes a circular aperture through which is inserted a fixed shaft 92. A first end of the fixed shaft 92 is attached to the rotation sensor 94, while a second opposed end of rotating shaft is connected to a sensor dial 102. Fixed shaft 92 is inserted in a cylindrically-shaped rotating shaft retainer 90. Shaft retainer 90 is inserted in an aperture 100*a* of a sensor housing 100. Disposed within sensor housing 100 is a torsion spring 106, with the torsion spring disposed about and connected to the shaft retainer 90 as both of these components are disposed within the sensor housing 100. Shaft retainer 90 extends through the sensor housing 100 and thus extends through aperture 100*a* as well as through a second aligned aperture in an opposing face of the sensor housing which is not shown in the figure for simplicity. A first combination of a bushing 108 and retaining ring 109*a* and a second combination of a bushing 110 and retaining ring 109*b* are disposed about the shaft retainer 90 in a spaced manner within the sensor housing 100 to maintain the shaft retainer within the housing while allowing the shaft retainer to freely rotate within the sensor housing. Retaining ring 109*a* is adapted for positioning within a first circumferential slot 90*a* within the rotating shaft retainer 90, while retaining ring 109*b* is adapted for positioning in a second circumferential slot (not shown in FIG. 3 for simplicity) for securely coupling the shaft retainer to housing 100 while allowing the shaft retainer to rotate. Also attached to the sensor housing 100 by means of the combination of a bolt 104*a* and a nut 104*b* is the aforementioned sensor dial 102. Sensor dial 102 is in the form of a thin, elongated pin-like structure which is wrapped around bolt 104*a* and freely rotatable about the bolt. One end of the sensor dial 102 is inserted into a notched end portion 92*a* of fixed shaft 92. In addition, one end of the torsion spring 106 is securely connected to the shaft retainer 90 within the sensor housing 100. By engaging the notched end portion 92*a* of the fixed shaft 92, sensor dial 102 securely maintains the fixed shaft in fixed position within the sensor housing 100 and establishes a zero elevation reference for the height sensor, which elevation reference point is adjustable. The elevation reference point may be easily changed by providing plural spaced apertures within housing 100, with each aperture adapted to receive the combination of bolt 104*a* and its associated nut 104*b* for changing the position of sensor dial 102 and the orientation at which it engages the end 92*a* of the fixed shaft 92. Shaft retainer 90 is freely rotatable on the fixed shaft 92 about which it is positioned. With the shaft retainer 90 attached to an end of the torsion spring 106, the torsion spring urges the shaft retainer to a given rotational position within the sensor housing 100. Rotational displacement of arm 72 which is attached to bracket 86 causes a corresponding rotational displacement of the combination of the shaft retainer 90. In the arrangement shown in FIG. 3, an inner portion of rotation sensor 94 is maintained fixed by the fixed shaft 92, while the sensor housing is allowed to rotate with the rotating shaft retainer 90 to provide an indication of the rotation of the sensor arm 72 about the axis of the shaft retainer within sensor housing 100. Rotation of shaft 90 is detected by the rotation sensor 94 which provides a corresponding signal via electrical connector 96 and lead(s) 97 to the controller interface 112 which, in turn, provides a signal to header controller 114. Header controller 114 is connected to the header for adjusting the height of the header in accordance with the rotation of sensor arm 72 as provided by the height sensor arrangement 70.

Figure 5A:
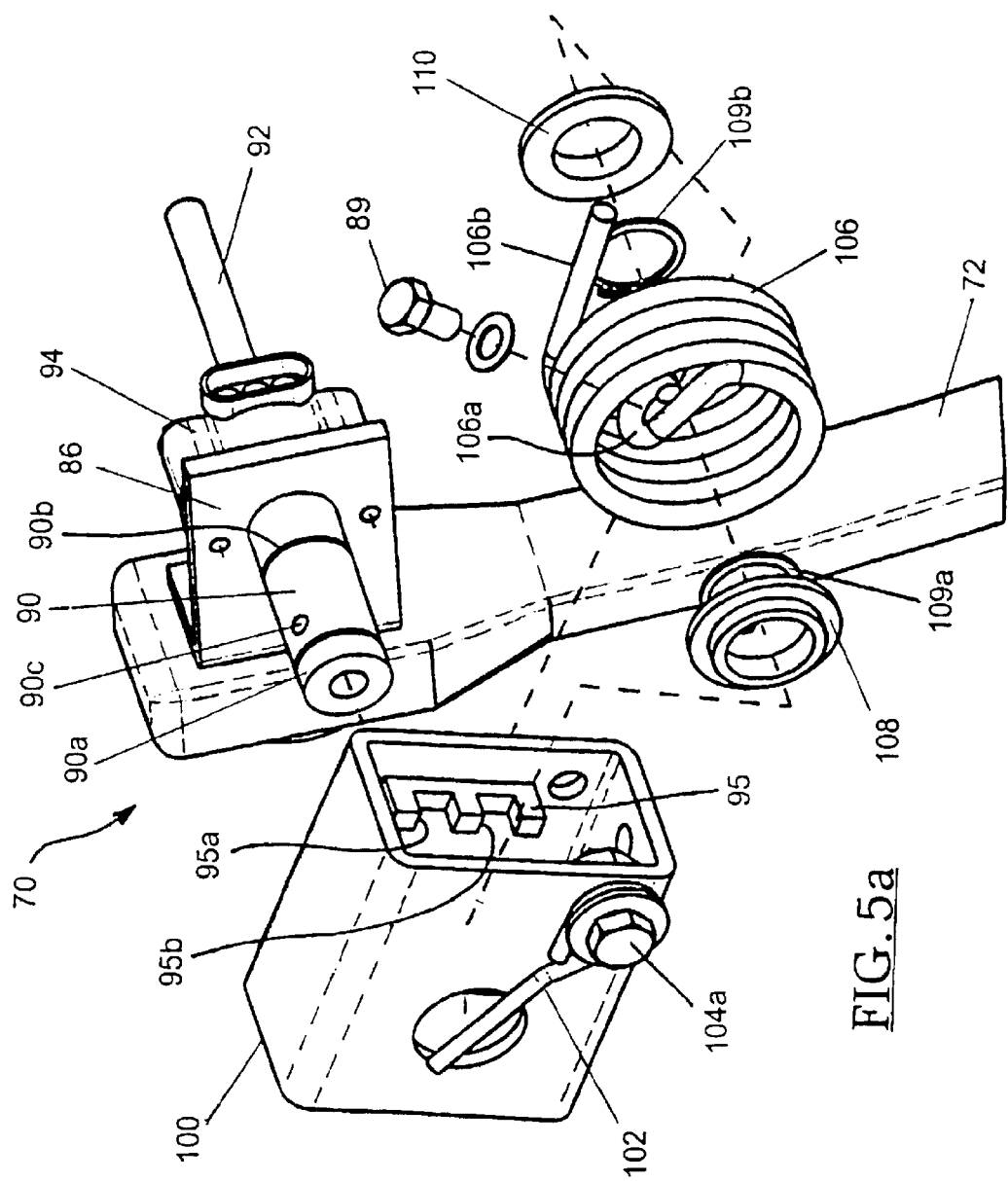
FIGS. 5a and 5b are respectively perspective exploded and assembled views of the height sensor of FIG. 5 which incorporates an adjustable feature for varying the downward, ground-engaging force exerted on the sensor arm.
Figure 5B:
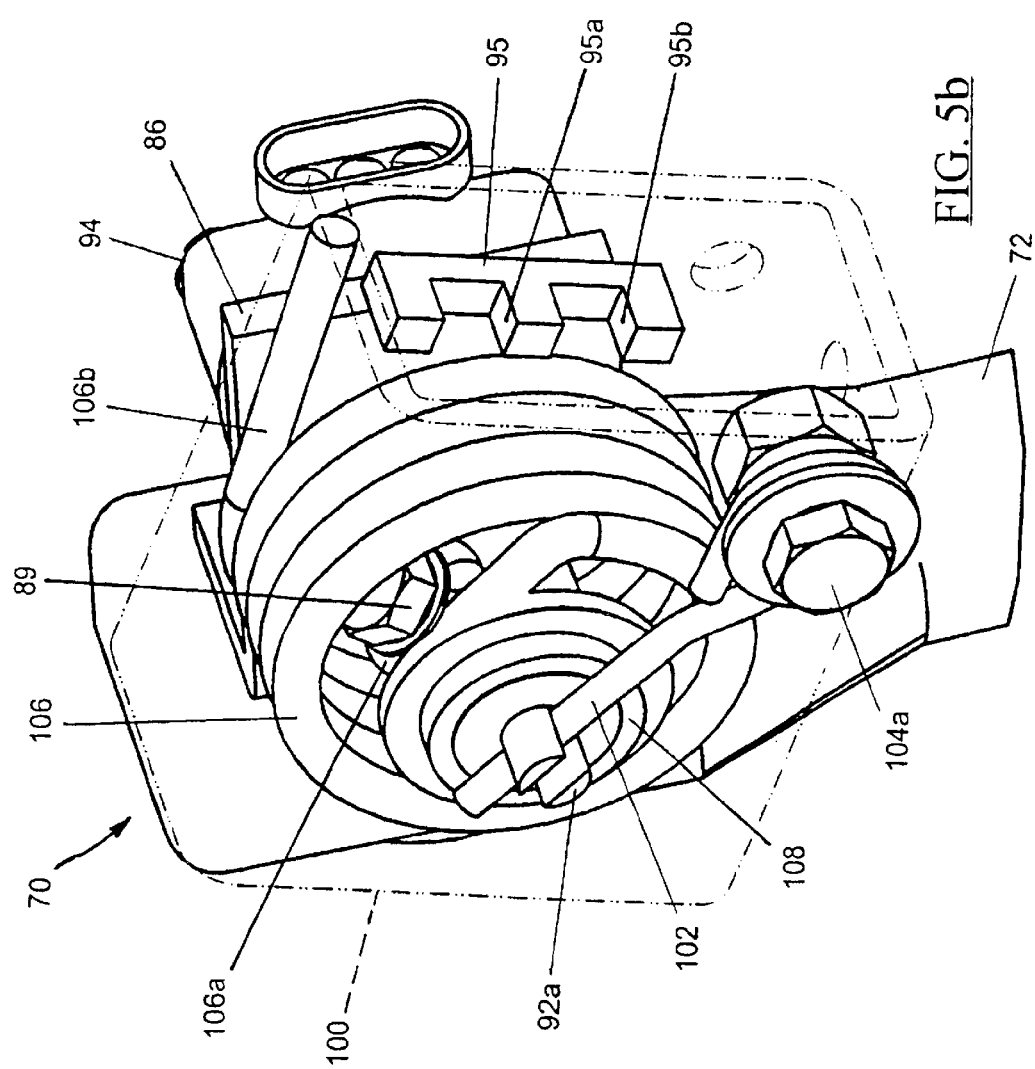

Referring to FIGS. 5*a* and 5*b*, there are respectively shown exploded and assembled perspective views illustrating additional details of the height sensor arrangement 70 shown in FIGS. 3, 4 and 5. As shown in FIGS. 5*a* and 5*b*, torsion spring 106 is attached to the shaft retainer 90 by means of a threaded pin 89, such as a bolt or screw, inserted through an inner portion 106*a* of the spring and into a threaded aperture 90*c* in a lateral surface of the shaft retainer. The outer end 106*b* of the torsion spring 106 is attached to the sensor housing 100 by means of a coupling bracket 95. Coupling bracket 95 is attached to an inner surface of sensor housing 100 by conventional means such as a threaded coupling pin which is not shown in the figure for simplicity. Coupling bracket 95 is in the general shape of the letter "E" and includes first and second spaced recesses 95*a* and 95*b*. Each of the first and second spaced recesses 95*a*, 95*b* is adapted to receive and securely engage the outer end 106*b* of torsion spring 106. Coupling bracket 95 and the two recesses 95*a* and 95*b* disposed therein allow the outer end 106*b* of the torsion spring 106 to be positioned in accordance with the amount of tension to be applied to the torsion spring. For example, with torsion spring 106 applying a rotational force to the sensor arm 72 about it pivot axis aligned with rotating shaft 92, this rotational force, and thus the downward force with which the distal end of the sensor arm 72 engages the ground or plant material disposed on the ground, may be adjusted, as desired. By positioning the outer end 106*b* of torsion spring 106 in the second, lower recess 95*b* within coupling bracket 95, the torsion spring may be maintained under increased tension for urging the distal end of the sensor arm 72 downward with greater force. On the other hand, by positioning the outer end 106*b* of torsion spring 106 within the first, upper recess 95*a* of coupling bracket 95, torsion spring 106 will be maintained under a reduced tension and will thus exert a reduced downward force on the distal end of sensor arm 72. In this manner, the force with which the distal end of sensor arm 72 engages the ground or plant material disposed on the ground may be adjusted as desired to permit the sensor arm to penetrate a range of thicknesses of plant material disposed on the ground. While the figures show the coupling bracket 95 as having only two adjustment positions, coupling bracket 95 may be sized and configured to include a large number of tension adjustment positions to permit the torsion spring 106 to apply a wide range of the ground engaging force to sensor arm 72.

As shown in FIG. 4, a sensor guard, or shielding plate, 124 is disposed adjacent the height sensor arrangement 70. Shielding plate 124 is attached to the header crop divider 120 by means of one or more threaded mounting pins 126. Shielding plate 124 is preferably comprised of a high strength, impact resistant material such as metal or plastic and protects the height sensor arrangement 70 from damage caused by impact with plant matter/crop residue as well as with obstructions in the field such as rocks.

Figure 6:
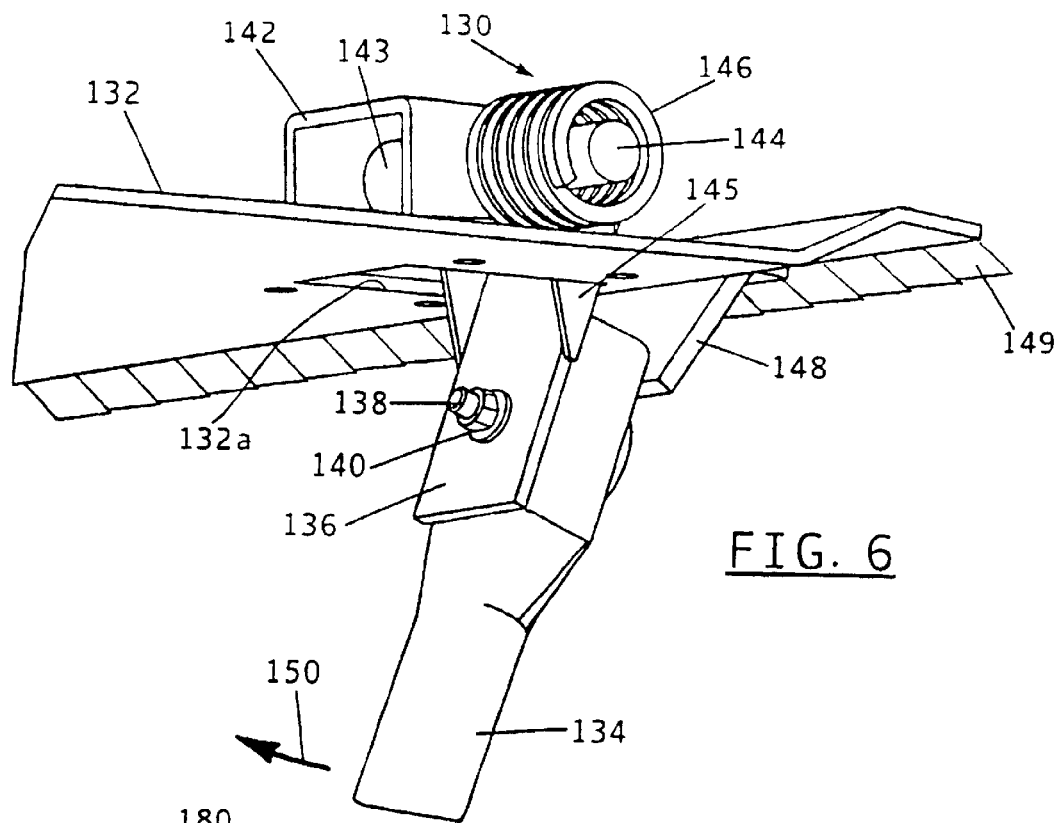
FIG. 6 is a partial perspective view of the embodiment of the height sensor shown in FIG. 2 illustrating additional details of the manner in which it is mounted in the header.

Referring to FIG. 6, there is shown a partial perspective view of another embodiment of a height sensor arrangement 130 in accordance with the present invention. The height sensor arrangement 130 shown in FIG. 6 is adapted for attachment to the skid plate 62 of a header 50 adjacent the header's cutter bar 149 such as illustrated in FIG. 2. In the embodiment shown in FIG. 6, the height sensor arrangement 130 is attached to the header skid plate 62 adjacent to, and extends through, an aperture 132*a* within the plate. The height sensor arrangement 130 includes a sensor housing 142 attached to an upper surface of the header skid plate 132 by means of plural threaded connectors. Disposed within and extending through facing apertures in opposed surfaces of the sensor housing 142 is a shaft retainer 143. Shaft retainer 143 is freely rotatable within the sensor housing 142 and is connected at one of its ends to a rotating shaft 144 as in the previously described embodiment. In the embodiment shown in FIG. 6, rotating shaft 144 is disposed within and extends through a torsion spring 146. One end of the torsion spring 146 is securely attached to either sensor housing 142 or skid plate 132, while a second end of the torsion spring is connected to the rotating shaft 144. A rotation sensor is also connected to the rotating shaft 144, although this is not shown in the figure for simplicity. Also attached to the rotating shaft 144 so as to rotate therewith is a coupling bracket 145. Coupling bracket 145 includes a generally flat mounting plate 136 to which is attached one end of a sensor arm 134 by means of the combination of a threaded pin 138 and nut 140. A combination of the coupling bracket 145 and mounting plate 136 extends through the aperture 132*a* within the header skid plate 132. As sensor arm 134 is deflected and displaced upon impact with the soil in the direction of arrow 150, the combination of the rotating shaft 144, coupling bracket 145 and mounting plate 136 rotates about a generally horizontal axis passing through the rotating shaft. The rotation sensor (not shown) coupled to the rotating shaft 144 detects rotation of the sensor arm 134 and provides an appropriate signal for controlling the height of the header above the soil. A sensor guard 148 in the form of a generally flat, high strength plate such as of steel or plastic is attached by conventional means such as weldments or threaded connecting pins to a lower surface of the header skid plate 132 for protecting the height sensor arrangement 130 from damage caused by impact with the soil.

Figure 7:
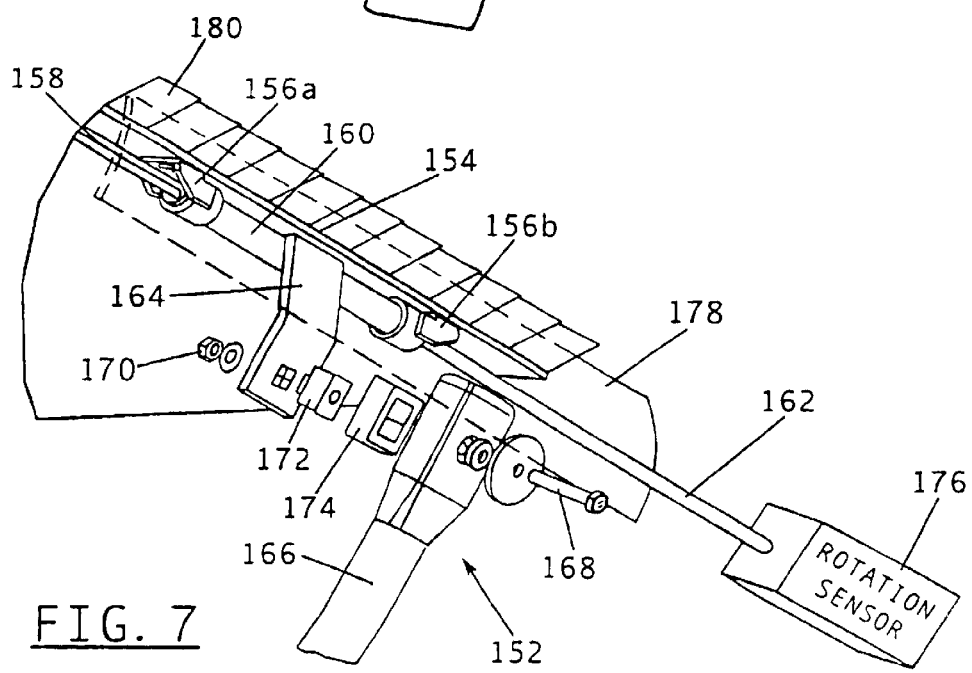
FIG. 7 is a perspective view of another embodiment of a height sensor in accordance with the principles of the present inventions.

Referring to FIG. 7, there is shown another embodiment of a height sensor arrangement 152 in accordance with the principles of the present invention. As in the previously described embodiment, the height sensor arrangement 152 shown in FIG. 7 is adapted for attachment to the lower, leading edge or surface of a header skid plate 154 adjacent the header's cutter bar 180. In the arrangement of FIG. 7, the upper end of a sensor arm 166 is attached to a coupling bracket 164 by means of the combination of an elastomeric bushing 174, an insert member 172, and a threaded pin 168 and nut 170 combination. Coupling bracket 164 is also attached to a cylindrical shaft coupler 160 by conventional means such as weldments, which are not shown in the figure for simplicity. First and second ends of the shaft coupler 160 are securely attached to a lower surface of the header skid plate 154 by means of first and second mounting brackets 156*a* and 156*b*, respectively. Shaft coupler 160 is rotatably attached to each of the first and second mounting brackets 156*a*, 156*b*, allowing the combination of coupling bracket 164 and sensor arm 166 attached thereto to freely rotate with respect to the header. A first end of the shaft coupler 160 is attached to a torsion bar 158, which is shown as having six sides, while a second opposed end of the shaft coupler is attached to a rotating shaft 162. The other end of the torsion bar 158 is fixedly attached to the header in a conventional manner such that the attached end of the torsion bar is not free to rotate about its longitudinal axis. The other end of the rotating shaft 162 is attached to a rotation sensor 176 which measures the extent of rotation of the shaft and sensor arm 166 attached thereto as in the previously described embodiments. Rotating shaft 162 may be rigid or it may be in the form of a flexible steel cable to facilitate mounting of the rotation sensor 176 on the header. Torsion bar 158 maintains the sensor arm 166 at a given inclination relative to the header and exerts a rotational force on the sensor arm which must be overcome prior to rotation of the sensor as it contacts the soil. The force applied to the sensor arm 166 by the torsion bar 158 maintains a distal end of sensor arm 166 in contact with the soil. An elongated, curvilinear shield 178 is shown in dotted line form mounted to a forward portion of the header to protect the height sensor arrangement from damage caused by impact with the crop or with obstructions in the field. Height sensor arrangement 152 incorporating the rigid, elongated torsion bar 158 may also provide for varying the downward force applied to the sensor arm 156 as in the previously described embodiment. For example, torsion bar 158 may be in the form of a six sided shaft as shown in FIG. 7 which is maintained in position by a mounting bracket (not shown) at least partially disposed about the torsion bar and attached to the header skid plate 154 by plural mounting pins (also not shown). Plural threaded apertures may be provided along the length of the mounting bracket, with each aperture adapted to receive a threaded pin which engages one of the lateral surfaces of the torsion bar 158. With the lower end of the sensor arm 166 engaging the ground, torsion bar 158 may be rotationally displaced so that the desired amount of downward force is applied to the sensor arm. The rotational position of the torsion bar 158 may then be locked in position by tightening the threaded pins engaging lateral surfaces of the torsion bar 158 and preventing it from rotating for maintaining the desired downward force on the sensor arm 166. Although this arrangement is not shown in the figures, it could easily be implemented by one skilled in the relevant arts.

Referring to FIGS. 8–12, the operation of the sensor arm 190 of the present invention will now be described. Sensor arm 192 includes first, second and third sections 192a, 192b and 192c. The first and second sections 192a, 192b are securely connected together by plural connecting pins 206, while the second and third sections of the sensor arm 192 are securely connected together by means of second plural connecting pins 208. A lower distal end of the sensor arm 192 is provided with a bulbous portion 204 for engaging the soil 210. Sensor arm 192 further includes a high strength plastic rod 200 and a metal reinforcing member 202 as in the previously described embodiments. Metal reinforcing member 202 is connected to and extends from a rotation sensor 194. The sensor arm's first section 192a is connected to the metal reinforcing member by means of a threaded connecting pin 196. The high strength plastic rod 200 is also connected to the metal reinforcing member 202 by conventional means and to the three sections of the sensor arm 192 by the first and second plural connecting pins 206 and 208 which draw adjacent portions of the arm together with the plastic rod between them in a clamping manner. Sensor arm 190 is first provided with a predetermined curvature as shown in the various figures.

Figure 8:
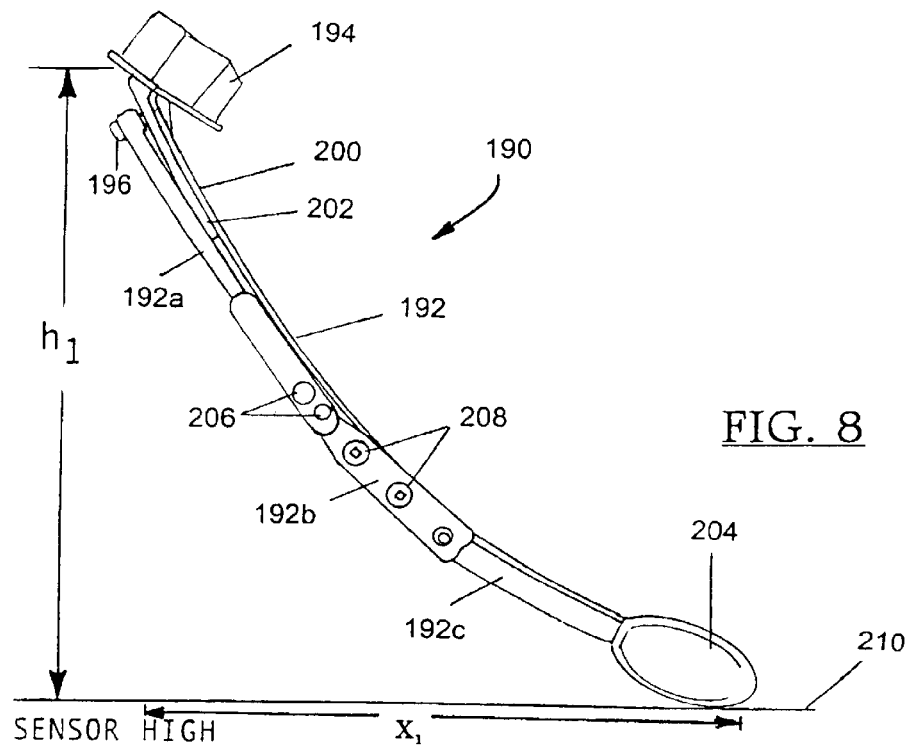
Figure 9:
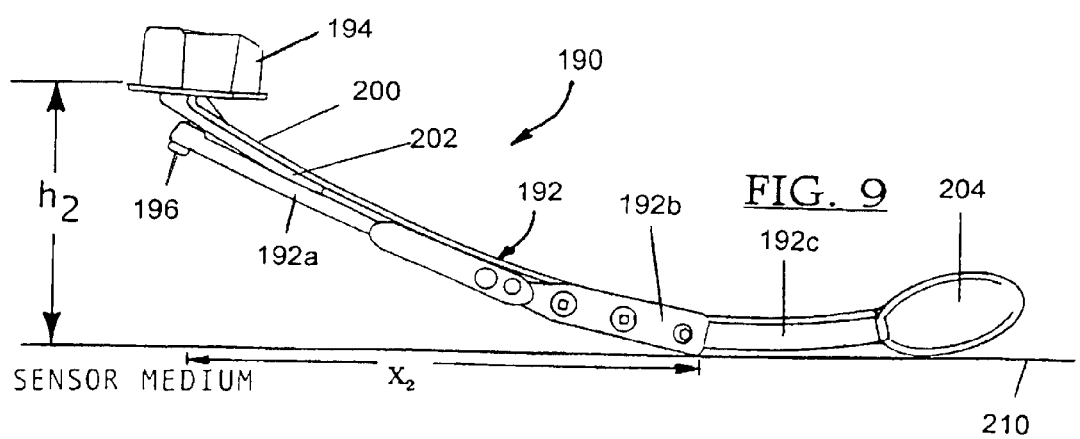

In FIG. 8, the height sensor arrangement 190 is shown in an elevated position, where the distance between the rotation sensor 194 (and the header to which it is attached), is shown as $h_1$. At this height, the bulbous portion 204 of the sensor arm 192 engages the soil 210 a distance $x_1$ aft of the rotation sensor 194, where the combine is moving in a direction from right to left as viewed in FIGS. 8–12. FIG. 9 is a side elevation view of the height sensor arrangement 190 at a medium height, where the distance between the rotation sensor 194 and the soil 210 is $h_2$. At this lower height, an intermediate portion of the sensor arm 192 engages the soil a distance $x_2$ aft of the rotation sensor 194, where $x_2<x_1$.

FIG. 10 shows the height sensor arrangement 190 at a lower elevation relative to the soil 210, where the distance between the rotation sensor 194 and the soil is $h_3$. In the lower position of FIG. 10, the curved sensor arm 192 engages the soil adjacent the center of the sensor arm at a distance $x_3$ aft of the rotation sensor 194, where $x_3<x_2<x_1$. FIG. 11 is a side elevation view of the height sensor arrangement 190 at an even lower position relative to the soil 210. At this height, the sensor arm 192 engages the soil at a location close to the proximal end of the arm and in closely spaced relation from the rotation sensor 194. At the reduced height of the rotation sensor 194 shown in FIG. 11, the point of contact of the sensor arm 192 with the soil is $x_4$ aft of the rotation sensor, where $x_4<x_3<x_2<x_1$. From FIGS. 8–11, it can be seen that as the height of the rotation sensor 194 (and thus the height of the header) is reduced, the point of contact of the sensor arm 192 moves forward in the direction of travel of the combine to provide an earlier warning of upraised portions of the soil to facilitate raising the header and avoiding contact with the soil and reducing the possibility of damaging the header.

FIG. 12 is a side elevation view of the height sensor arrangement 190, with the rotation sensor 194 in contact with the soil and the sensor arm in a substantially linear configuration. The header and height sensor arrangement would not be operated as shown in FIG. 12, but this figure illustrates the high strength and flexibility of the sensor arm 192 which allows for contact of a lower portion of the header with the soil so as to position the sensor arm in contact with the soil along a substantial portion of its length without damaging or breaking the sensor arm. In addition, the substantially flat configuration assumed by the sensor arm 192 when in substantially full contact with the soil without damage to the sensor arm eliminates the requirement for a recess in the lower surface of the header to receive the sensor arm when the header is in contact with the soil as in some current headers.

While particular embodiments of the present invention have been shown and described, it will be obvious to those skilled in the relevant arts that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. Apparatus for use in an agricultural implement for measuring the height of said agricultural implement above the soil as said agricultural implement traverses a field, said apparatus comprising:

a shaft mounted to the agricultural implement;

rotation sensing means coupled to said shaft and responsive to rotation of said shaft for providing an output signal representing rotational displacement of said shaft; and a curved flexible arm having a proximal end connected to said shaft and a distal end engaging the soil, wherein said arm is concave in an upward direction and rotates in a first direction when said arm contacts upraised soil and rotates in a second opposed direction when said arm contacts a depression in the soil, and wherein a point of contact of said arm with the soil moves forward in a direction of travel of the implement toward the proximal end of said arm as the height of the implement above the soil is reduced to provide an increasingly early indication of contact with the soil of the implement as its height above the soil decreases.

2. The apparatus of claim 1 further comprising biasing means coupled to said shaft for urging said shaft and arm in said second direction of rotation.

3. The apparatus of claim 2 wherein said biasing means is a spring.

4. The apparatus of claim 3 wherein said spring is a coiled torsion spring.

5. The apparatus of claim 2 wherein said biasing means is a linear torsion bar.

6. The apparatus of claim 1 wherein said agricultural implement is a crop harvesting header and said apparatus further comprises means for mounting said apparatus to an end panel of said header.

7. The apparatus of claim 6 further comprising guard means attached to said header adjacent said rotation sensing means for shielding said rotation sensing means from impact with plants or other obstructions in a field traversed by the agricultural implement.

8. The apparatus of claim 7 wherein said guard means comprises a plate attached to the end panel of said header, and wherein said rotation sensing means is disposed intermediate said end panel and said plate.

9. The apparatus of claim 1 wherein said agricultural implement is a crop harvesting header having a crop divider attached thereto, and wherein said apparatus further comprises means for mounting said apparatus to said crop divider.

10. The apparatus of claim 1 wherein said agricultural implement is a crop harvesting header having a bottom skid plate and said apparatus further comprises means for mounting said apparatus to said skid plate.

11. The apparatus of claim 10 wherein said crop harvesting header further includes a crop cutting assembly disposed immediately forward of said skid plate and wherein said means for mounting said apparatus is disposed adjacent said crop cutting assembly.

12. The apparatus of claim 11 wherein said mounting means is disposed immediately aft of said crop cutting assembly.

13. The apparatus of claim 10 wherein said skid plate includes an aperture, and wherein said rotation sensing means is disposed adjacent said aperture and said arm extends through said aperture.

14. The apparatus of claim 13 further comprising guard means attached to said skid plate adjacent the aperture therein for shielding said rotation sensing means from impact with plants and other obstructions in a field traversed by the agricultural implement.

15. The apparatus of claim 14 wherein said guard means comprises a flat plate mounted to said skid plate forward of the aperture therein.

16. The apparatus of claim 1 wherein said arm is comprised of an outer elastomeric sheath and an inner core member of high strength steel.

17. The apparatus of claim 16 wherein said arm further comprises a metal reinforcing member disposed within said sheath adjacent said inner core member.

18. The apparatus of claim 17 wherein said metal reinforcing member is disposed in the proximal end of said arm.

19. The apparatus of claim 18 wherein each of said elastomeric sheath, inner core member and metal reinforcing member are curvilinear in shape.

20. The apparatus of claim 1 wherein said arm is comprised of plural elastomeric members connected together in an end-to-end manner and a core member of high strength plastic coupled to said elastomeric members.

21. The apparatus of claim 20 wherein said arm further comprises a metal reinforcing member disposed in the proximal end of said arm.

22. The apparatus of claim 21 wherein each of said connected elastomeric members, said core member and said metal reinforcing member is curvilinear in shape.

23. The apparatus of claim 22 further comprising a bulbous member disposed on the distal end of said arm.

24. The apparatus of claim 2 wherein said biasing means includes, in combination, a spring and means for changing a tension in said spring for setting the downward force on the distal end of said arm to a selected value within a range of downward force values.

25. The apparatus of claim 1 further comprising input means for establishing a zero elevation reference height for said rotation sensing means relative to the surface of the soil.

26. The apparatus of claim 25 wherein said input means is adjustable for establishing a selected zero elevation reference height from a range of zero elevation reference height values.

27. The apparatus of claim 26 wherein said rotation sensing means includes a spring and said input means is coupled to said spring for applying a tension on said spring corresponding to a zero elevation reference height.

28. The apparatus of claim 27 wherein said input means permits changing the tension applied to said spring for changing the zero elevation reference height to a selected value.

29. The apparatus of claim 1 wherein said agricultural implement is a crop harvesting header and includes a crop cutting assembly, said apparatus further including means for mounting said flexible arm adjacent said crop cutting assembly.

30. The apparatus of claim 29 wherein said mounting means is disposed immediately aft of said crop cutting assembly.

31. An arrangement attached to an agricultural header assembly used in the harvesting of crops for controlling the height of said header assembly above the soil, said header assembly including a lower surface and cutting mechanism for cutting crops, said arrangement comprising:
  a rotation sensor attached to the header assembly forward of said cutting mechanism;
  a curved, flexible ground engaging arm having a first end attached to said rotation sensor and a second opposed free end extending rearwardly and disposed below and forward of said cutting mechanism, wherein variation in soil elevation causes deflection of said arm and displacement of said rotation sensor for providing a height control signal, and wherein as the height of the header assembly above the soil decreases, said arm engages the soil at an increasingly forward location along the length of said arm to allow for earlier detection of elevated soil as the height of the header assembly above the soil is reduced for avoidance of soil contact with the cutting mechanism, and wherein when said arm encounters elevated soil and is deflected, said arm contacts the lower surface of the header assembly and assumes a less curved configuration; and
  a height controller coupled to the header assembly and to said rotation sensor and responsive to said height control signal for raising the header assembly when said arm encounters elevated soil.

32. An arm for use in a rotation sensor mounted to an agricultural implement for engaging the ground and providing an indication of the height of the implement above the ground, wherein said agricultural implement includes a bottom panel, said arm comprising:

a first variably curved, flexible, elongated elastomeric member having opposed proximal and distal ends, wherein said proximal end is coupled to said sensor and said distal end engages the ground;

a second variably curved, flexible, elongated member comprised of a high strength material and coupled to and extending substantially between the proximal and distal ends of said first member, said second member having a proximal end coupled to said sensor; and a third variably curved high strength rigid member disposed adjacent to and coupled to the respective proximal portions of said first and second members, wherein all of the members have the same curvature and the curvature of the members allows a point of contact of said arm with the ground to move toward said sensor with a lowering of the height of the sensor above the ground, and wherein said arm contacts the bottom panel of the agricultural implement and assumes a less curved configuration when said arm engages an elevated portion of the around.

33. Apparatus for use in an agricultural implement having a skid panel for measuring the height of the skid panel of said agricultural implement above the soil as said agricultural implement traverses a field, said apparatus comprising:

a shaft mounted to the agricultural implement;

rotation sensing means coupled to said shaft and responsive to rotation of said shaft for providing an output signal representing rotational displacement of said shaft; and a curved flexible arm having a proximal end connected to said shaft and a distal end engaging the soil, wherein said arm is concave in an upward direction and rotates in a first direction when said arm contacts upraised soil and rotates in a second opposed direction when said arm contacts a depression in the soil, and wherein said arm is characterized as having increasing stiffness in proceeding from its distal end to its proximal end and wherein said arm assumes a less curved configuration and engages the skid panel of the agricultural implement when said arm contacts upraised soil.

34. Apparatus for use in an agricultural implement for measuring the height of said agricultural implement above the soil as said agricultural implement traverses a field, said apparatus comprising:

a shaft mounted to the agricultural implement;

rotation sensing means coupled to said shaft and responsive to rotation of said shaft for providing an output signal representing rotational displacement of said shaft; and a curved flexible arm having a proximal end connected to said shaft and a distal end engaging the soil, wherein said arm is concave in an upward direction and rotates in a first direction when said arm contacts upraised soil and rotates in a second opposed direction when said arm contacts a depression in the soil, and wherein a point of contact of said arm with the soil moves forward in a direction of travel of the implement toward the proximal end of said arm as the height of the implement above the soil is reduced to provide an increasingly early indication of contact with the soil of the implement as its height above the soil decreases; and biasing means coupled to said shaft for urging said shaft and arm in said second direction of rotation, wherein said biasing means applies a downward force on the distal end of said arm engaging the soil, and wherein said biasing means is adjustable for selecting the downward force on said arm over a range of downward forces.

35. The apparatus of claim 34 wherein said biasing means includes a spring, and wherein a position of said spring is movable over a range of positions for setting the downward force on the arm's distal end to a selected value.

36. The apparatus of claim 35 wherein said biasing means further includes a coupling bracket having plural spaced recesses each adapted for engaging said spring, and wherein the downward force on the arm's distal end is established by positioning said spring in one of said recesses of said coupling bracket.

37. For use on a header attached to a combine, said header including a crop engaging and gathering mechanism located in a forward, lower portion of said header for removing the crop from a field and providing the crop to the combine for processing therein, a sensor arrangement for maintaining the header a selected height above the ground comprising:

a rotation sensor;

a flexible curved arm having a proximal end coupled to said rotation sensor and an opposed distal end engaging the ground, wherein said arm rotates about its proximal end in a first direction when the distal end of said arm engages an upraised portion of ground and rotates in a second opposed direction when the distal end of said arm engages a depression in the ground; and mounting means for attaching said arm and rotation sensor to the header at a location forward of or adjacent to the header's crop engaging and gathering mechanism for preventing contact between the header and an upraised portion of the ground.

38. The sensor arrangement of claim 37 wherein said header includes a crop row separating structure extending forward of the crop engaging and gathering mechanism, and wherein said mounting means includes a mounting bracket for attaching said arm and rotation sensor to said crop row separating structure.

39. The sensor arrangement of claim 38 wherein said header further includes first and second crop row separating structures each attached to a respective end of said header, and wherein said sensor arrangement includes first and second rotation sensor and arm combinations each attached to a respective one of said first and second crop row separating structures.

40. The sensor arrangement of claim 37 wherein the distal end of said arm engages the ground at a location below the crop engaging and gathering mechanism when the header is in an upraised position relative to the ground.

41. The sensor arrangement of claim 38 further comprising a guard structure attached to said crop row separating structure for preventing contact of said rotation sensor and mounting means with the crop and any ground obstructions.

42. The sensor arrangement of claim 37 wherein said mounting means is attached to the header adjacent the crop engaging and gathering mechanism with said arm extending downwardly and rearwardly from the crop engaging and gathering mechanism.

43. The sensor arrangement of claim 42 further comprising a guard structure attached to said header for preventing contact of said rotation sensor and mounting means with the crop and any ground obstructions.

44. The sensor arrangement of claim 37 wherein said header includes a bottom skid plate, and wherein said mounting means attaches said arm and rotation sensor to said skid plate, and said arm engages said skid plate and assumes a less curved configuration when said arm engages an upraised portion of ground and undergoes substantial rotation in said first direction.

45. The sensor arrangement of claim 44 wherein a forward portion of said skid plate is disposed adjacent the crop engaging and gathering mechanism, and wherein said arm extends downwardly and rearwardly from the crop engaging and gathering mechanism.

46. The sensor arrangement of claim 45 wherein the forward portion of said skid plate includes an aperture disposed adjacent said mounting means, and wherein said arm extends through said aperture.

47. The sensor arrangement of claim 46 further comprising a guard structure attached to said skid plate for preventing contact of said rotation sensor and mounting means with the crop and any ground obstructions.

48. The sensor arrangement of claim 37 wherein a point of contact of said arm with the ground moves forwardly along the length of said arm in a direction of travel of the combine through a field as the height of the header above the ground is reduced to provide an increasingly early warning of contact of the header with the ground as the header gets closer to the ground.

49. Apparatus for use in an agricultural implement for measuring the height of said agricultural implement above the soil as said agricultural implement traverses a field, said apparatus comprising:

a shaft mounted to the agricultural implement;

rotation sensing means coupled to said shaft and responsive to rotation of said shaft for providing an output signal representing rotational displacement of said shaft; and a curved flexible arm having a proximal end connected to said shaft and a distal end engaging the soil, wherein said arm is concave in an upward direction and rotates in a first direction when said arm contacts upraised soil and rotates in a second opposed direction when said arm contacts a depression in the soil, and wherein said arm is characterized as having increasing stiffness in proceeding from its distal end to its proximal end.

50. Apparatus for use in an agricultural implement for measuring the height of said agricultural implement above the soil as said agricultural implement traverses a field, said apparatus having a lower surface disposed above the soil, said apparatus comprising:

a shaft mounted to the agricultural implement;

rotation sensing means coupled to said shaft and responsive to rotation of said shaft for providing an output signal representing rotational displacement of said shaft; and a curved flexible arm having a proximal end connected to said shaft and a distal end engaging the soil, wherein said arm is concave in an upward direction and rotates in a first direction when said arm contacts upraised soil and rotates in a second opposed direction when said arm contacts a depression in the soil, and wherein a point of contact of said arm with the soil moves forward in a direction of travel of the implement toward the proximal end of said arm as the height of the implement above the soil is reduced to provide an increasingly early indication of contact with the soil of the implement as its height above the soil decreases, and wherein said arm engages the lower surface of the apparatus and assumes a less curved configuration when said arm contacts upraised soil.

51. The apparatus of claim 50 wherein said agricultural implement is a crop harvesting header having a bottom skid plate forming the lower surface of the apparatus.

52. The apparatus of claim 51 further comprising means for mounting said apparatus to said skid plate.

53. The apparatus of claim 52 wherein said crop harvesting header further includes a crop cutting assembly disposed immediately forward of said skid plate and wherein said means for mounting said apparatus is disposed adjacent said crop cutting assembly.

54. The apparatus of claim 53 wherein said mounting means is disposed immediately aft of said crop cutting assembly and said arm engages said skid plate and assumes a less curved configuration when said arm enrages an upraised portion of ground and undergoes substantial rotation in said first direction.

55. The apparatus of claim 52 wherein said skid plate includes an aperture, and wherein said rotation sensing means is disposed adjacent said aperture and said arm extends through said aperture.

56. The apparatus of claim 55 further comprising guard means attached to said skid plate adjacent the aperture therein for shielding said rotation sensing means from impact with plants and other obstructions in a field traversed by the agricultural implement.

57. The apparatus of claim 56 wherein said guard means comprises a flat plate mounted to said skid plate forward of the aperture therein.

58. An arm for use in a rotation sensor mounted to an agricultural implement for engaging the ground and providing an indication of the height of the implement above the ground, said arm comprising:

a first variably curved, flexible, elongated elastomeric member having opposed proximal and distal ends, wherein said proximal end is coupled to said sensor and said distal end engages the ground;

a second variably curved, flexible, elongated member comprised of a high strength material and coupled to and extending substantially between the proximal and distal ends of said first member, said second member having a proximal end coupled to said sensor; and a third variably curved high strength rigid member disposed adjacent to and coupled to the respective proximal portions of said first and second members, wherein all of the members have the same curvature and the curvature of the members allows a point of contact of said arm with the ground to move toward said sensor with a lowering of the height of the sensor above the ground.

59. The arm of claim 58 wherein said second and third members are encapsulated within said first elastomeric member.

60. The arm of claim 59 wherein proximal end portions of said first and second members each include a respective aperture adapted to receive a connecting pin for coupling said first and second members to said sensor.

61. The arm of claim 60 wherein said second and third members are comprised of a high strength metal.

62. The arm of claim 58 wherein said first member includes coupling means on a distal portion thereof for connecting said first member to a restraining member attached to the implement for preventing damage to the arm when the implement is displaced in a reverse direction.

63. The arm of claim 62 wherein said restraining member is a flexible steel cable having first and second opposed ends respectively coupled to the agricultural implement and said first member.

64. The arm of claim 58 wherein said first member includes plural curved sections coupled together in a generally end-to-end manner.

65. The arm of claim 64 wherein said first member includes first, second and third sections, and wherein said arm further includes first and second coupling means for respectively coupling said first and second sections and said second and third sections.

66. The arm of claim 65 wherein each of said first and second coupling means includes one or more coupling pins.

67. The arm of claim 66 wherein said second member is disposed between adjacent portions of the first, second and third sections of said first member, and wherein said adjacent portions of said sections are drawn together by said first and second coupling means and engage said second member in a clamping manner.

68. The arm of claim 58 further comprising a bulbous member disposed in the distal end of said first member.

69. The arm of claim 58 wherein said arm has decreasing stiffness in proceeding from its proximal to its distal end.

70. An arrangement attached to an agricultural header assembly used in the harvesting of crops for controlling the height of said header assembly above the soil, said header assembly including a cutting mechanism for cutting crops, said arrangement comprising:
 a rotation sensor attached to the header assembly forward of said cutting mechanism;
 a curved, flexible ground engaging arm having a first end attached to said rotation sensor and a second opposed free end extending rearwardly and disposed below and forward of said cutting mechanism, wherein variations in the soil elevation causes deflection of said arm and displacement of said rotation sensor for providing a height control signal, and wherein as the height of the header assembly above the soil decreases, said arm engages the soil at an increasingly forward location along the length of said arm to allow for earlier detection of elevated soil as the height of the header assembly above the soil is reduced for avoidance of soil contact with the cutting mechanism; and
 a height controller coupled to the header assembly and to said rotation sensor and responsive to said height control signal for raising the header assembly when said arm encounters elevated soil.

71. Apparatus for measuring the height of an agricultural implement above the soil as said agricultural implement traverses a field, said apparatus comprising:
 a shaft mounted to the agricultural implement;
 rotation sensing means coupled to said shaft and responsive to rotation of said shaft for providing an output signal representing rotational displacement of said shaft;
 an arm having a proximal end connected to said shaft and a distal end engaging the soil, wherein said arm rotates in a first direction when said arm contacts upraised soil and rotates in a second opposed direction when said arm contacts a depression in the soil, and wherein rotation of said arm as detected by said sensing means provides an indication of the height of the agricultural implement above the soil; and
 biasing means for applying a downward force on the distal end of said arm engaging the soil, wherein said biasing means is adjustable for selecting a downward force applied to said arm over a range of downward forces.

72. The apparatus of claim 71 wherein said biasing means is coupled to said shaft for urging said shaft and arm in said second direction of rotation.

73. The apparatus of claim 72 wherein said biasing means includes a spring, and wherein a position of said spring is movable over a range of positions for setting the downward force on the arm's distal end to a selected value.

74. The apparatus of claim 73 wherein said biasing means further includes a coupling bracket having plural spaced recesses each adapted for engaging said spring, and wherein the downward force on the arm's distal end is established by positioning said spring in one of said recesses of said coupling bracket.

75. The apparatus of claim 71 wherein said biasing means includes, in combination, a spring and means for changing a tension in said spring for setting the downward force on the distal end of said arm to a selected value within a range of downward force values.

76. The apparatus of claim 75 further comprising input means for establishing a zero elevation reference height for said rotation sensing means relative to the surface of the soil.

77. The apparatus of claim 76 wherein said input means is adjustable for establishing a selected zero elevation reference height from a range of zero elevation reference height values.

78. The apparatus of claim 77 wherein said input means is coupled to a shaft extending through said spring and said input means fixes a rotational position of said shaft in establishing a zero elevation reference height.

79. The apparatus of claim 78 wherein said input means permits changing the rotational position of said shaft for changing the zero elevation reference height to a selected value.

80. The apparatus of claim 71 wherein said agricultural implement is a crop harvesting header and includes a crop cutting assembly, said apparatus further including means for mounting said arm adjacent said crop cutting assembly.

81. The apparatus of claim 80 wherein said mounting means is disposed immediately aft of said crop cutting assembly.

82. The apparatus of claim 71 wherein said agricultural implement is a crop harvesting header and said apparatus further comprises means for mounting said apparatus to an end panel of said header.

83. The apparatus of claim 82 further comprising guard means attached to said header adjacent said rotation sensing means for shielding said rotation sensing means from impact with plants or other obstructions in a field traversed by the agricultural implement.

84. The apparatus of claim 71 wherein said agricultural implement is a crop harvesting header having a crop divider attached thereto, and wherein said apparatus further comprises means for mounting said apparatus to said crop divider.

85. The apparatus of claim 71 wherein said agricultural implement is a crop harvesting header having a bottom skid plate and said apparatus further comprises means for mounting said apparatus to said skid plate.

86. The apparatus of claim 85 wherein said crop harvesting header further includes a crop cutting assembly disposed immediately forward of said skid plate and wherein said means for mounting said apparatus is disposed adjacent said crop cutting assembly.

87. The apparatus of claim 85 wherein said skid plate includes an aperture, and wherein said rotation sensing means is disposed adjacent said aperture and said arm extends through said aperture.

88. The apparatus of claim 87 further comprising guard means attached to said skid plate adjacent the aperture therein for shielding said rotation sensing, means from impact with plants and other obstructions in a field traversed by the agricultural implement.

89. The apparatus of claim 80 wherein said header includes a crop row separating structure extending forward of a crop engaging and gathering mechanism, and wherein said mounting means includes a mounting bracket for attaching said arm and rotation sensing means to said crop row separating structure.

90. The apparatus of claim 89 wherein said header further includes first and second crop row separating structures each attached to a respective end of said header, and wherein said apparatus includes first and second rotation sensor and arm combinations each attached to a respective one of said first and second crop row separating structures.

91. The apparatus of claim 89 further comprising a guard structure attached to said crop row separating structure for preventing contact of said rotation sensor and mounting bracket with the crop and any ground obstructions.

92. The apparatus of claim 89 wherein said mounting bracket is attached to the header adjacent said crop engaging and gathering mechanism with said arm extending downwardly and rearwardly from the crop engaging and gathering mechanism.

93. An arm for use in a rotation sensor in an agricultural implement for engaging the soil and providing an indication of the height of the implement above the soil, said arm comprising:

a first curved, flexible, elongated member having a proximal end coupled to the rotation sensor and an opposed, distal end engaging the soil, wherein said elongated member is comprised of a single niece of elastomeric material; and a second curved metal reinforcing member disposed in a proximal end portion of said first member for increasing the strength of said arm, wherein said arm is capable of lateral bending in a direction generally transverse to a direction of travel of the implement upon impact of the arm with the soil or an obstruction in the soil.

94. The arm of claim 93 wherein said first member includes coupling means on a distal portion thereof for connecting said first member to a restraining member attached to the implement for preventing damage to the arm when the implement is displaced in a reverse direction.

95. The arm of claim 94 wherein said restraining member is a flexible steel cable having a first and second opposed ends respectively coupled to the agricultural implement and said first member.

96. The arm of claim 95 further comprising a bulbous member disposed on the distal end of said first member.

97. The arm of claim 96 wherein said first and second members have the same curvature.

98. The arm of claim 97 wherein each of said first and second members has a variable radius along its entire length.

* * * * *

UNITED STATES PATENT AND TRADEMARK OFFICE
CERTIFICATE OF CORRECTION

PATENT NO.   : 6,883,299 B1
DATED        : April 26, 2005
INVENTOR(S)  : Richard Gramm It is certified that error appears in the above-identified patent and that said Letters Patent is hereby corrected as shown below:

Column 16,
Line 14, change "enrages" to -- engages --

Signed and Sealed this

Nineteenth Day of July, 2005

JON W. DUDAS
*Director of the United States Patent and Trademark Office*